United States Patent Office 3,091,526
Patented May 28, 1963

3,091,526
HIGH-PURITY TITANIUM PRODUCTION
Robert M. Fowler, Niagara Falls, and Arnold R. Gahler, Lewiston, N.Y., assignors to Union Carbide Corporation, a corporation of New York
No Drawing. Filed Jan. 8, 1957, Ser. No. 632,970
4 Claims. (Cl. 75—84.5)

This invention relates to a process for separating impurities from titanium sponge by aqueous leaching wherein hydrogen evolution is minimized.

In the production of titanium by reduction of a stoichiometric excess of titanium halide with an alkali metal, the reaction product comprises titanium sponge, alkali metal halide, and halides of titanium. Leaching of this product with water has been suggested as an economical means for separating the metal halides and other impurities from the sponge. However, subhalides of titanium react with water to precipitate insoluble titanium oxy-compounds in the pores of the sponge, making it very difficult to produce a leached product free from titanium oxy-compound contamination. It has been found that the incorporation of an acid such as hydrochloric acid or sulfuric acid in the water leach serves to retard the oxy-compound precipitation, thereby permitting the leaching of the soluble impurities away from the titanium sponge.

Titanium metal which had been purified by such an acid leaching may often exhibit low impact strength when fabricated into useful end-products. This characteristic has been traced to the presence of hydrogen in the titanium. A major source of hydrogen is that evolved during the acid leaching step by the reduction of hydrogen ions to elemental hydrogen by divalent titanium ions.

One method which has been employed to counteract the tendency for hydrogen formation during leaching is the oxidation of the divalent titanium ions to a higher oxidation state by including an oxidizing agent, such as ferric chloride, in the acidic leach solution. However, such a process is difficult to control to obtain a uniform product, is not easily adaptable to ordinary recovery process, and tends to produce a product contaminated with metallic impurities.

It is an object of this invention to provide an improved method for leaching the reaction product which has been produced by reaction between excess titanium halide and an alkali metal.

It is another object to provide a process for producing titanium sponge which has a low hydrogen content. Other objects will be apparent from the disclosure and appended claims.

The objects are achieved by treating acid reaction product, i.e., product prepared by the reaction of a stoichiometric excess of titanium halide with an alkali metal, with a reagent which forms a stable complex with divalent titanium ions. With the divalent titanium ions tied up in complexes, the hydrogen-forming reaction is prevented, thereby sharply reducing the amount of hydrogen available for absorption by the titanium metal.

Since hydrogen evolution may be minimized by complexing the divalent titanium ions, it follows that the effectiveness of controlling hydrogen evolution will depend, at least in part, upon the effectiveness of the complexing of the divalent titanium ion. Thus, for maximum benefit from the complexing action, the complexing agent should be added in an amount at least stoichiometrically equivalent to the amount of divalent titanium ion, and preferably in excess over the stoichiometrical amount, to obtain substantially complete complexing of the divalent titanium ion. Similarly, the operating conditions should be such that the complex is stable for the duration of the treatment. For example, raising the temperature of the treating solution tends to destroy the complex, thereby permitting the reaction between the divalent titanium ion and hydrogen ions. For the same reasons, pH control is necessary. Many of the complexes are stable in acid solutions only, while other complexes can withstand mildly alkaline conditions. Failure to operate within the proper range may decrease the effectiveness of the complexing reagent.

Water-soluble, weak organic acids and salts thereof which liberate the weak organic acid anions in solution provide good complexing action. Oxalic acid and acetic acid are two acids which are particularly effective in preventing hydrogen evolution during leaching.

The leach solution may be prepared from salts of the complexing agent provided that the complexing agent is liberated in solution. The inclusion of a mineral acid with these salts tends to increase the ease of liberation of the complexing ion.

The preferred leaching solution comprises a weak organic acid and a mineral acid such as hydrochloric acid. Reaction product which was leached with such a solution had a very low hydrogen content, and products fabricated from such a reaction product did not show the low impact properties of products fabricated from reaction product leached with mineral acids alone.

The effect of acetic and hydrchloric acid leaches may be demonstrated by the examples shown in Table I. In each example leaching was performed at room temperature by agitating the sample and leach solution for 30 minutes. The reaction product which had been ground to 1/8 inch maximum particle size was then filtered from the solution, washed with plain water and dried at approximately 120° C.

*Table I*

| Reaction Product, grams | Leach Solution | Hydrogen Content of Leached Sponge (p.p.m.) |
|---|---|---|
| 110 | 1% HCl | 76 |
| 100 | 1% HCl—1% HAc | 30 |
| 110 | 5% HAc | 22 |
| 120 | 10% HAc | 21 |
| 105 | 25% HAc | 19 |

A similar experiment employing a 1% hydrochloric acid–1% oxalic acid leach solution showed little or no hydrogen evolution, thereby indicating that elemental hydrogen was not being produced in excessive quantities. A further example of the effectiveness of oxalic acid in minimizing hydrogen concentration may be noted from the examples of Table II wherein titanium reaction product was leached with hydrochloric acid and with a hydrochloric acid-oxalic acid mixture. In each case, 300 grams of the sample which had a particle size such that the material passed through an 8-mesh screen were leached for an hour with 1500 cubic centimeters of the leach solution and filtered. The residue was washed with 1500 cubic centimeters of water for 15 minutes, filtered, and dried.

*Table II*

Leach solution:                      $H_2$ content of leached sponge (p.p.m.)
    1% HCl _____ 267
    1% HCl+0.1% oxalic acid_____ 130

The effectiveness of other organic acids as compared to hydrochloric acid alone is shown in the data of Table III. In these examples, about 100 gram samples wherein the maximum particle size was 1/8-inch were leached for 30 minutes, washed twice with 5-minute, one-liter washes, and dried.

Table III

| Leach solution: | $H_2$ content of leached titanium (p.p.m.) |
|---|---|
| 1% HCl | 140 |
| 5% acetic acid | 100 |
| 1% HCl+1% acetic | 110 |
| 1 M citric acid | 110 |
| 1 M tartaric acid | 110 |
| 1 M formic acid | 120 |

In still another example of the effectiveness of the present invention, samples were screened to pass through an 8-mesh screen and remain on a 48-mesh screen. For each leaching, about 325 grams of the fraction were agitated for an hour with 1500 cubic centimeters of the leach solution, the mixture filtered on a Buchner funnel, the residue mixed with 1500 cubic centimeters of water for 15 minutes and filtered, and the metal residue dried. The results of this treatment are shown in Table IV.

Table IV

| Leach Solution | Percent Sol. Ti in Leach | $H_2$ Content of Leached Titanium (p.p.m.) |
|---|---|---|
| 1% HCl | 0.16 | 101 |
| 0.5% HCl—0.15% Oxalic Acid | 0.15 | 63 |
| 5% Acetic Acid | 0.07 | 84 |
| 1% HCl—0.5% Sodium Citrate | 0.16 | 66 |
| 5% Citric Acid | 0.15 | 76 |

The effectiveness of these treatments is not limited to hydrogen control. Precipitation of titanium oxy-compounds occurs after two or three hours in a mineral acid leach solution, whereas a leaching solution containing hydrochloric acid and oxalic acid showed no signs of such precipitation after 24 hours had elapsed.

The examples of Table V illustrate that reaction product may be leached according to the teachings of the present invention to provide a titanium product low in both hydrogen and oxy-compound contamination. In these examples, the reaction product was leached with a liter of the designated solution for 30 minutes at room temperature, washed twice with one-liter, five-minute water washes, and dried.

Table V

| Reactor Product, grams | Leach Solution | $H_2$ Content of Leached Sponge, p.p.m. | $O_2$ Content of Leached Sponge, percent |
|---|---|---|---|
| 175 | 1% hydrochloric acid | 216 | .07 |
| 145 | do | 242 | .07 |
| 96 | 1% hydrochloric acid plus 1% sulfosalicylic acid | 85 | .07 |

In an example of the use of a salt of a weak organic acid as a leaching agent, 120 grams of the reactor product of Table V were leached for 30 minutes with a liter of a 5 percent ammonium citrate solution which had been adjusted to a pH of 7 with sodium hydroxide, washed twice with one-liter, five-minute water washes, and dried. The leached sponge had a hydrogen content of 70 p.p.m.

That it is possible to obtain a uniform product by the present process is demonstrated by the fact that in 21 tests, the hydrogen content of the leached titanium sponge was in the range of from 23 to 35 parts per million.

The complexing agents are easily recovered from the leaching solution by standard techniques. For example, acetic acid may be recovered by distillation and oxalic acid may be recovered with lime and regenerated with sulfuric acid.

After the complexing and leaching step are completed, the product should be washed with water or dilute hydrochloric acid and dried to remove the remaining leach solution from the titanium.

What is claimed is:

1. In a process for the preparation of titanium by the reaction of a stoichiometrical excess of a titanium halide and an alkali metal to produce a reaction product consisting essentially of titanium metal, alkali metal halide and titanium subhalide, the improvement which comprises intimately contacting said reaction product with an aqueous solution consisting essentially of a complexing agent selected from the group consisting of oxalic acid, tartaric acid, citric acid and salts thereof which liberate the acid anions in solution dissolved in dilute aqueous hydrochloric acid whereby the formation of a stable complex of titanium ion is effected; removing the solution containing the complexed titanium ion from contact with the titanium metal; washing the titanium metal whereby residual complexing agent is substantially removed; and drying the washed titanium metal.

2. A process in accordance with claim 1 wherein said complexing agent is oxalic acid.

3. A process in accordance with claim 1 wherein said complexing agent is tartaric acid.

4. A process in accordance with claim 1 wherein said complexing agent is citric acid.

References Cited in the file of this patent

UNITED STATES PATENTS

| | | |
|---|---|---|
| 1,704,257 | Marden | Mar. 5, 1929 |
| 1,729,765 | Dinley | Oct. 1, 1929 |
| 2,318,559 | Percival | May 4, 1943 |
| 2,537,067 | Lilliendahl | Jan. 9, 1951 |
| 2,537,068 | Lilliendahl et al. | Jan. 9, 1951 |
| 2,707,149 | McKinley | Apr. 26, 1955 |
| 2,707,679 | Lilliendahl et al. | May 3, 1955 |
| 2,750,271 | Cueilleron et al. | June 12, 1956 |
| 2,816,020 | Quin | Dec. 10, 1957 |

FOREIGN PATENTS

| | | |
|---|---|---|
| 1,085,933 | France | Aug. 4, 1954 |
| 1,089,488 | France | Sept. 29, 1954 |
| 726,367 | Great Britain | Mar. 16, 1955 |
| 66,249 | France | Mar. 12, 1956 |
| | (2nd addition to No. 1,085,933) | |